United States Patent [19]

Kawasaki et al.

[11] Patent Number: 4,723,624
[45] Date of Patent: Feb. 9, 1988

[54] TORQUE CONTROL ARRANGEMENTS FOR FOUR-WHEEL-DRIVE VEHICLES

[75] Inventors: Shunsuke Kawasaki; Kenichi Watanabe, both of Hiroshima, Japan

[73] Assignee: Mazda Motor Corporation, Japan

[21] Appl. No.: 900,526

[22] Filed: Aug. 26, 1986

[30] Foreign Application Priority Data

Aug. 26, 1985 [JP] Japan .................. 60-187097
Aug. 26, 1985 [JP] Japan .................. 60-187099

[51] Int. Cl.⁴ .................. B60K 17/34; B60K 23/08
[52] U.S. Cl. .................. 180/233; 180/247; 180/248; 180/249; 192/0.033; 192/48.3
[58] Field of Search ............ 180/233, 247, 248, 249, 180/250; 192/0.033, 58 C, 0.076, 0.075, 48.3, 87.12

[56] References Cited

U.S. PATENT DOCUMENTS

| | | | |
|---|---|---|---|
| 3,923,113 | 12/1975 | Pagdin | 180/249 X |
| 4,484,653 | 11/1984 | Horikoshi et al. | 180/233 |
| 4,562,897 | 1/1986 | Renneker | 180/247 X |

FOREIGN PATENT DOCUMENTS

2139972A 11/1984 United Kingdom ............... 180/233

Primary Examiner—John A. Pekar
Attorney, Agent, or Firm—Gerald J. Ferguson, Jr.; Michael P. Hoffman; Michael J. Foycik, Jr.

[57] ABSTRACT

A torque control arrangement for a four-wheel-drive vehicle comprises a fluid torque transmitting device disposed in a front or rear torque transmitting path and operative to vary torque transmitted therethrough in response to a difference between input speed and output speed thereof, a clutch device provided in series to the fluid torque transmitting device, front and rear speed reduction devices for determining a final drive ratio in the front torque transmitting path and a final drive ratio in the rear torque transmitting path, respectively, first and second speed sensors for detecting the input speed and the output speed of the fluid torque transmitting device, respectively, and a control unit operative to disengage the clutch device when a speed difference obtained by substracting the output speed of said fluid torque transmitting device from the input speed of said fluid torque transmitting device is reduced to a range of positive values, the upper limit of which is not greater than a predetermined small value close to zero.

11 Claims, 7 Drawing Figures

TORQUE CONTROL ARRANGEMENTS FOR FOUR-WHEEL-DRIVE VEHICLES

BACKGROUND OF THE INVENTION

1. Field of the Invention

The present invention relates generally to torque control arrangements for four-wheel-drive vehicles, and more particularly, to an arrangement for controlling torque transmitted from a power plant through a torque transmitting path to front and rear wheels in a four-wheel-drive vehicle.

2. Description of the Prior Art

One type of four-wheel drive vehicle in which an all-wheel drive and a front or rear wheel drive are adopted selectively in response to the conditions of roadways has been put to practical use. In such a type of four-wheel-drive vehicle, for the purpose of having a smooth changeover of the all-wheel drive into the front or rear wheel drive and also a smooth changeover of the front or rear wheel drive into the all-wheel drive, there has been proposed to use a torque controlling arrangement including a wet clutch device disposed in either a front torque transmitting path through which torque from a power plant is transmitted to front wheels or a rear torque transmitting path through which the torque from the power plant is transmitted to rear wheels, as disclosed in, for example, the Japanese utility model application published before examination under the publication number 56/122630.

In a four-wheel-drive vehicle which employs the torque controlling arrangement provided with the wet clutch device as mentioned above, the changeover between the all-wheel drive and the front or rear wheel drive is carried out in accordance with manipulation of a switch or the like provided on, for example, a gear shift lever conducted by a driver of the vehicle in response to the driving condition of the vehicle, the conditions of roadways and so on. Accordingly, it is required for the driver to have annoying handlings whenever the changeover between the all-wheel drive and the front or rear wheel drive is carried out, and further there is the defect that undesirable shock is apt to be induced on the occasion of the changeover between the all-wheel drive and the front or rear wheel drive in the case where a speed difference between the front and rear wheels is relatively large.

So, there has been also proposed a torque control arrangement for a four-wheel-drive vehicle in which a viscous fluid clutch which is operative to vary torque transmitted therethrough in response to a difference between input speed and output speed thereof is disposed in one of torque transmitting paths provided on the side of right and left front wheels and on the side of right and left rear wheels, respectively, and thereby torque transmitted to the right and left front wheels or the right and left rear wheels is varied in response to a difference between the average speed relative to the right and left front wheels and the average speed relative to the right and left rear wheels, so that the changeover of the all-wheel drive into the front or rear wheel drive and the changeover of the front or rear wheel drive into the all-wheel drive are performed automatically.

However, in such a torque control arrangement provided with the viscous fluid clutch for varying the torque transmitted to the front wheels or the rear wheels in response to the speed difference between the front and rear wheels, there are problems arising as follows.

In the torque control arrangement provided with the viscous fluid clutch as mentioned above, even if a difference between input speed and output speed of the viscous fluid clutch is reduced enough to be close to zero under a condiction wherein a vehicle employing the arrangement is making a stabilized straight drive, a certain small torque is actually transmitted through the viscous fluid clutch and thereby generation of some heat is raised in the viscous fluid clutch. Such a generation of heat exerts a harmful influence upon the viscous fluid clutch so as to lower the durability of the same.

Figure 1:
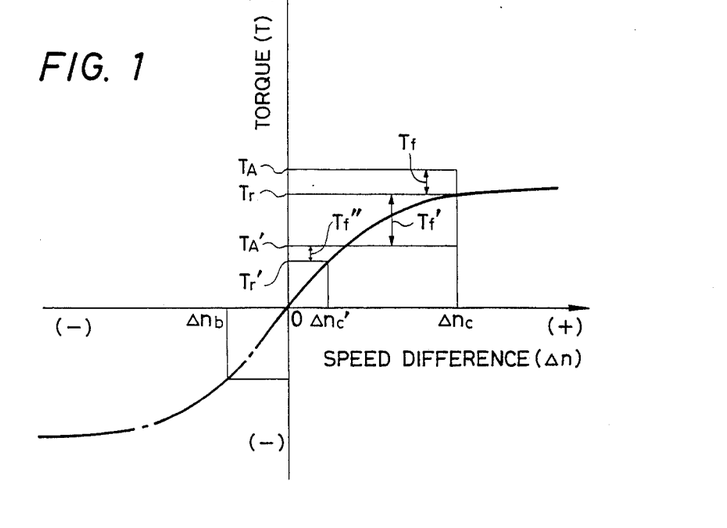
FIG. 1 is a graph illustrating the relation between torque transmitted to front or rear wheels of a four-wheel-drive vehicle and speed difference between input speed and output speed of a fluid torque transmitting device used in the four-wheel-drive vehicle.

Further, considering an ordinary case where a viscous fluid clutch is disposed in a torque transmitting path in a four-wheel-drive vehicle provided on the side of front wheels each having the same diameter as each of rear wheels, by way of example, such a torque transmission characteristic as shown in FIG. 1, where the axis of abscissas represents speed difference ($\Delta n$) between input speed and output speed of a fluid torque transmitting device, such as the viscous fluid clutch, obtained by subtracting the output speed from the input speed and the axis of ordinates represents torque (T) transmitted to front or rear wheels of a four-wheel-drive vehicle in which the fluid torque transmitting device is employed, is obtained through the viscous fluid clutch. That is, positive torque (referred to as driving torque, hereinafter) is transmitted through the viscous fluid clutch to the rear wheels when the speed difference $\Delta n$ is positive, as indicated with a curve of solid line in FIG. 1, while negative torque (referred to as braking torque, hereinafter) is transmitted through the viscous fluid clutch to the rear wheels when the speed difference $\Delta n$ is negative, as indicated with a curve of dot-and-dash line in FIG. 1. In the situation wherein the braking torque is transmitted to the rear wheels in this manner, the rear wheels bring forth undesirable running resistance to the vehicle, and this results in higher fuel consumption and increased wear to various parts of the vehicle.

OBJECTS AND SUMMARY OF THE INVENTION

Accordingly, it is an object of the present invention to provide a torque control arrangement for a four-wheel-drive vehicle, which avoids the aforementioned problems encountered with the prior art.

Another object of the present invention is to provide a torque control arrangement for a four-wheel-drive vehicle, which employs a fluid torque transmitting device operative to vary torque transmitted therethrough in response to a difference between input speed and output speed thereof and disposed in a torque transmitting path provided in the vehicle for transmitting torque generated by a power plant to front or rear wheels, and in which transmission of torque through the fluid torque transmitting device is ceased when the difference between input speed and output speed of the fluid torque transmitting device is reduced to be sufficiently close to zero, so that the fluid torque transmitting device is prevented from being lowered in durability.

A further object of the present invention is to provide a torque control arrangement for a four-wheel-drive vehicle, which employs a fluid torque transmitting device operative to vary torque transmitted therethrough in response to a difference between input speed and output speed thereof and disposed in a torque transmitting path provided in the vehicle for transmitting torque generated by a power plant to front or rear wheels, and by which each of the front and rear wheels is prevented from being supplied with braking torque through the fluid torque transmitting device.

A further object of the present invention is to provide a torque control arrangement for a four-wheel-drive vehicle, which employs a fluid torque transmitting device operative to vary torque transmitted therethrough in response to a difference between input speed and output speed thereof and disposed in a torque transmitting path provided in the vehicle for transmitting torque generated by a power plant to front or rear wheels, and in which a clutch device is disposed also in the torque transmitting path in series to the fluid torque transmitting device to be engaged or disengaged in response to a speed difference obtained by subtracting the output speed from the input speed of the fluid torque transmitting device, so as to cause a changeover between an all-wheel drive and a front or rear wheel drive in the vehicle.

A further object of the present invention is to provide a torque control arrangement for a four-wheel-drive vehicle, which employs a fluid torque transmitting device operative to vary torque transmitted therethrough in response to a difference between input speed and output speed thereof and disposed in a torque transmitting path provided in the vehicle for transmitting torque generated by a power plant to front or rear wheels, and in which a clutch device is disposed also in the torque transmitting path in series to the fluid torque transmitting device to be engaged or disengaged so as to cause a changeover between an all-wheel drive and a front or rear wheel drive in the vehicle and further is prevented from inducing undesirable shocks on the occasion of engagement or disengagement thereof.

A still further object of the present invention is to provide a torque control arrangement for a four-wheel-drive vehicle, which employs a fluid torque transmitting device operative to vary torque transmitted therethrough in response to a difference between input speed and output speed thereof and disposed in a torque transmitting path provided in the vehicle for transmitting torque generated by a power plant to front or rear wheels, and in which a clutch device is disposed also in the torque transmitting path in series to the fluid torque transmitting device to be engaged or disengaged so as to cause a changeover between an all-wheel drive and a front or rear wheel drive in the vehicle, and braking torque is prevented from being transmitted to the front wheels even if the torque generated by the power plant is reduced while the vehicle is cornering.

According to the present invention, there is provided a torque control arrangement for a four-wheel-drive vehicle, which comprises a fluid torque transmitting device disposed in either a front torque transmitting path through which torque generated by a power plant is transmitted to front wheels or a rear torque transmitting path through which the torque generated by the power plant is transmitted to rear wheels and operative to vary torque transmitted therethrough in response to a difference between input speed and output speed thereof; a clutch device provided in series to the fluid torque transmitting device for making and breaking the front or rear torque transmitting path in which the fluid torque transmitting device is disposed; a front speed reduction device for determining a final drive ratio in the front torque transmitting path; a rear speed reduction device for determining a final drive ratio in the rear torque transmitting path; a first speed sensor for detecting the input speed of the fluid torque transmitting device; a second speed sensor for detecting the output speed of the fluid torque transmitting device; and a control unit operative on the strength of detection outputs of the first and second speed sensors to cause the clutch device being in engagement to be disengaged when a speed difference obtained by subtracting the output speed from the input speed of the fluid torque transmitting device has reduced in the range of positive value to be equal to or less than a predetermined small value close to zero.

In an embodiment of torque control arrangement according to the present invention taken by way of example, the control unit supplies the clutch device with a clutch control signal for causing the clutch device to have switchover between engagement and disengagement thereof at an instant earlier by a time corresponding to the time required for the operation for changing the state of the clutch device than an instant at which the output speed of the fluid torque transmitting device becomes equal to the input speed of the fluid torque transmitting device.

Further, in the embodiment, the final drive ratio in the rear torque transmitting path is arranged to be larger than the final drive ratio in the front torque transmitting path.

In the torque control arrangement thus constituted in accordance with the present invention, when the output speed of the fluid torque transmitting device is higher than the input speed of the fluid torque transmitting device, the control unit supplies the clutch device with a clutch control signal for causing the clutch device to be disengaged, so that the vehicle is put in the condition of a front or rear wheel drive, namely, a two-wheel drive. Under the front or rear wheel drive thus taken in the vehicle, running resistance to the vehicle brought forth undesirably by the front or rear wheels is effectively diminished, and therefore fuel consumption is improved and various parts of the vehicle are prevented from being lowered in durability.

While, when the speed difference obtained by subtracting the output speed from the input speed of the fluid torque transmitting device is larger than the predetermined small value close to zero, that is, the front wheels rotate with slipping, the control unit supplies the clutch device with another clutch control signal for causing the clutch device to be engaged, so that the vehicle is put in the condition of an all-wheel drive. Under the all-wheel drive thus taken in the vehicle, a part of the torque generated by the power plant is transmitted through the fluid torque transmitting device to the rear wheels in response to the slip at the front wheels so that the travelling performance of the vehicle is improved.

Accordingly, with the torque control arrangement according to the present invention, the front or rear wheel drive and the all-wheel drive are selected appropriately in response to the driving conditions of the vehicle automatically with the advantages that fuel consumption is improved, various parts of the vehicle are prevented from being lowered in durability and the travelling performance of the vahicle is improved.

In the embodiment, since the clutch control signal from the control unit is supplied to the clutch device at an instant earlier by a time corresponding to the time required for the operation for changing the state of the clutch device than an instant at which the output speed of the fluid torque transmitting device becomes equal to the input speed of the fluid torque transmitting device, whenever the clutch device is caused to carriy out the switchover between engagement and disengagement thereof, the switchover between engagement and disengagement of the clutch device is just completed at the instant at which the speed difference obtained by subtracting the output speed from the input speed of the fluid torque transmitting device becomes zero. Consequently, undesirable shocks are not induced on the occasion of the engagement or disengagement of the clutch device, and therefore various parts of the clutch device are prevented from being lowered in durability.

Further, the final drive ratio in the rear torque transmitting path is arranged to be larger than the final drive ratio in the front torque transmitting path in the embodiment. Accordingly, when the vehicle equipped with such an embodiment is cornering, for example, as shown in FIG. 1, the speed difference ($\Delta n$) obtained by subtracting the output speed from the input speed of the fluid torque transmitting device takes value $\cdot \Delta n_c'$ smaller than value $\cdot \Delta n_c$ which the speed difference ($\Delta n$) takes in the case where the final drive ratio in the rear torque transmitting path is arranged to be equal to the final drive ratio in the front torque transmitting path. So, even if the torque generated by the power plant is reduced from $T_A$ to $T_A'$ while the vehicle is cornering, as shown in FIG. 1, the rear wheels are supplied with driving torque Tr' and the front wheels are also supplied with driving torque Tf" instead of any braking torque. Consequently, the front wheels are prevented from bringing forth running resistance to the vehicle so that the driving efficiency of the vehicle during its cornering is improved and the turning radius of the vehicle is restricted preferably.

The above, and other objects, features and advantages of the present invention will become apparent from the following detailed description which is to be read in conjunction with the accompanying drawings.

DESCRIPTION OF THE PREFERRED EMBODIMENTS

Figure 2:
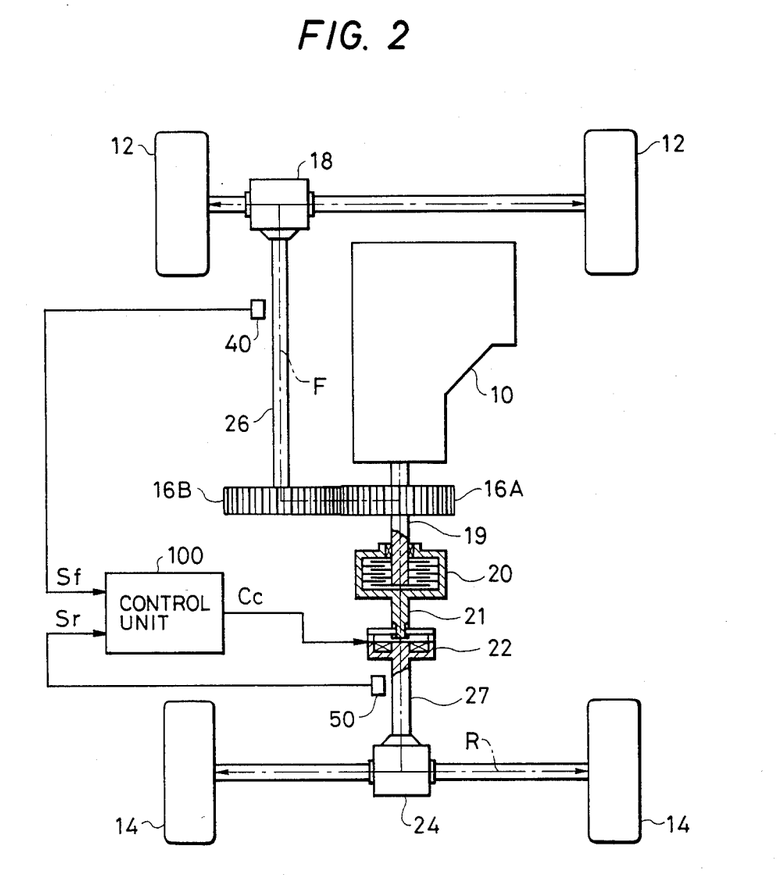
FIG. 2 is a schematic illustration showing one embodiment of torque control arrangement for a four-wheel-drive drive vehicle according to the present invention, together with portions of a four-wheel-drive vehicle to which the embodiment is applied.

FIG. 2 illustrates schematically an example of a torque control arrangement for a four-wheel-drive vehicle according to the present invention, together with portions of a four-wheel-drive vehicle to which the example is applied.

In the example of FIG. 1, torque generated by a power plant 10 which includes an engine and a transmission coupled with the engine is transmitted to right and left front wheels 12 through a front torque transmitting path F indicated with a dot-and-dash line and also to right and left rear wheels 14, each of which has the same diameter as each of the front wheels 12, through a rear torque transmitting path R indicated with a dot-and-dash line.

A pair of gears 16A and 16B each having teeth of the same number and a front final gear unit 18 containing final drive and differential gears for the front wheels 12 are disposed in the front torque transmitting path F. A final drive ratio $i_f$ in the front torque transmitting path F is determined by a front speed reduction device constituted in the front final gear unit 18. Meanwhile, a viscous fluid clutch 20 which is operative to vary torque transmitted therethrough in response to a difference between speed of an input shaft 19 (input speed of the viscous fluid clutch 20) and speed of an output shaft 21 (output speed of the viscous fluid clutch 20), an electromagnetic clutch 22 provided in sereis to the viscous fluid clutch 20, and a rear final gear unit 24 containing final drive and differential gears for the rear wheels 14 are disposed in the rear torque transmitting path R. A final drive ratio $i_r$ in the rear torque transmitting path R, which is larger than the final drive ratio $i_f$ in the front torque transmitting path F, is determined by a rear speed reduction device constituted in the rear final gear unit 24.

Further, a control unit 100 is provided for controlling the electromagnetic clutch 22. To the control unit 100, a detection signal Sf obtained from a front speed sensor 40 detecting the speed of an input shaft 26 of the front final gear unit 18, which is identical with the input speed of the viscous fluid clutch 20 and in proportion to the speed of the front wheels 12 (the average speed relative to the right and left front wheels 12), and a detection signal Sr obtained from a rear speed sensor 50 detecting the speed of an input shaft 27 of the rear final gear unit 24, which is identical with the output speed of the viscous fluid clutch 20 under the condition that the electromagnetic clutch 22 is engaged and in proportion to the speed of the rear wheels 14 (the average speed relative to the right and left front wheels 14), are supplied.

The control unit 100 is operative on the strength of the detection signals Sf and Sr to supply the electromagnetic clutch 22 with a clutch control signal Cc having a first level for causing the electromagnetic clutch 22 to be engaged when a speed difference obtained by subtracting the speed of the input shaft 27 proportional to the speed of the rear wheels 14 from the speed of the input shaft 26 proportional to the speed of the front wheels 12 is larger than a predetermined small value close to zero, and further to supply the electromagnetic clutch 22 with the clutch control signal Cc having a second level for causing the electromagnetic clutch 22 to be disengaged when the speed difference obtained by subtracting the speed of the input shaft 27 from the speed of the input shaft 26 is equal to or less than the predetermined small value close to zero. In such an operation of the control unit, actually, the second level of the clutch control signal Cc is selected to be a zero level and the supply of the clutch control signal Cc having the second level to the electromagnetic clutch 22 is achieved by means of ceasing to supply the clutch control signal Cc having the first level.

Under the control by the control unit 100 as mentioned above, the electromagnetic clutch 22 is energized with the clutch control signal Cc havig the first level to be in engagement thereof and thereby the output shaft 21 of the viscous fluid clutch 20 is coupled with the input shaft 27 of the rear final gear unit 24 when the speed difference obtained by subtracting the speed of the input shaft 27 from the speed of the input shaft 26 is larger than the predetermined small value close to zero, and de-energized due to stoppage of the supply of the clutch control signal Cc to be in disengagement thereof and thereby the output shaft 21 of the viscous fluid clutch 20 is broken with the input shaft 27 of the rear final gear unit 24 when the speed difference obtained by subtracting the speed of the input shaft 27 from the speed of the input shaft 26 is equal to or less than the predetermined small valve close to zero.

With the configuration described above, torque generated by the power plant 10 is transmitted through the front torque transmitting path to the front wheels 12 so as to cause the vehicle to be in the driving state. In the case where the vehicle is running straight on, since the final drive ratio $i_r$ in the rear torque transmitting path R is larger than the final drive ratio $i_f$ in the front torque transmitting path F, the speed of the input shaft 26 of the front final gear unit 18 is kept to be lower than the speed of the input shaft 27 of the rear final gear unit 24 and therefore a speed difference $\Delta n$ obtained by subtracting the output speed from the input speed of the viscous fluid clutch 20 takes a negative value such as $\Delta n_b$ indicated in FIG. 1. Accordingly, the control unit 100 ceases supplying the electromagnetic clutch 22 with the clutch control signal Cc so as to cause the same to be disengaged. As a result, the vehicle is kept to run straight on in the state of a front wheel drive with reduced running resistance, and therefore fuel consumption is improved and various parts of the vehicle are prevented from being lowered in durability.

Then, when a certain slip arises on the front wheels 12, the speed difference $\Delta n$ takes a positive value. Accordingly, the control unit 100 supplies the electromagnetic clutch 22 with the clutch control signal Cc having the first level so as to cause the same to be engaged. As a result, a part of the torque generated by the power plant 10 is transmitted through the read torque transmitting path to the rear wheels 14 in response to the slip at the front wheels 12, so that the vehicle is caused to run in the state of an all-wheel drive and the travelling performance of the vehicle is improved.

On the other hand, in the case where the vehicle is cornering, since the turning radius of each of the front wheels 12 is set to be larger than that of the corresponding rear wheel 14 and therefore the speed of the input shaft 26 of the front final gear unit 18 becomes higher than the speed of the input shaft 27 of the rear final gear unit 24. Accordingly, the control unit 100 supplies the electromagnetic clutch 22 with the clutch control signal Cc having the first level so as to cause the same to be engaged.

Hereupon, assuming that the final drive ratio $i_r$ in the rear torque transmitting path R were equal to the final drive ratio $i_f$ in the front torque transmitting path F and torque $T_A$ is generated by the power plant 10, driving torque Tf is transmitted to the front wheels 12 and further driving torque Tr is transmitted to the rear wheels 14 at the speed difference $\Delta n$ of a positive value such as $\Delta n_c$ indicated in FIG. 1. Under such a situation, if the torque generated by the power plant 10 is reduced, for example, from $T_A$ to $T_A'$, as shown in FIG. 1, a difference Tf' between the torque $T_A'$ and the driving torque Tr is transmitted to the front wheel 12 as braking torque.

However, in fact, since the final drive ratio $i_r$ in the rear torque transmitting path R is larger than the final drive ratio $i_f$ in the front torque transmitting path F, driving torque larger than the driving torque Tf is transmitted to the front wheels 12 and driving torque smaller than the driving torque Tr is transmitted to the rear wheels 14 at the speed difference $\Delta n$ of a reduced positive value such as $\Delta n_c'$ indicated in FIG. 1 under the situation in which the power plant 10 generates the torque $T_A$. Accordingly, even if the torque generated by the power plant 10 is reduced, for example, from $T_A$ to $T_A'$, driving torque Tr' as indicated in FIG. 1 is still transmitted to the rear wheels 14 and driving torque Tf'' as indicated in FIG. 1 is transmitted to the front wheels 12. Consequently, the driving efficiency for the vehicle in its cornering is improved and the turning radius of the vehicle is restricted preferably.

In the manner described above, the changeover of the all-wheel drive to the front wheel drive and the changeover of the front wheel drive to the all-wheel drive in the vehicle are carried out automatically with the operation of the electromagnetic clutch 22 controlled by the control unit 100 in the embodiment shown in FIG. 2. However, it is feared that undesirable shocks resulting from the engagement or disengagement of the electromagnetic clutch 22 are induced dependently upon the timing of the changeover between the all-wheel drive and the front wheel drive. Accordingly, in the embodiment shown in FIG. 2, the control unit 100 controls the timing of supplying the electromagnetic clutch 22 with the clutch control signal Cc for causing the same to be engaged and also the timing of ceasing to supply the clutch control signal Cc so as to cause the electromagnetic clutch 22 to be disengaged in such a manner as to avoid the undesirable shocks mentiones above.

Figure 3:
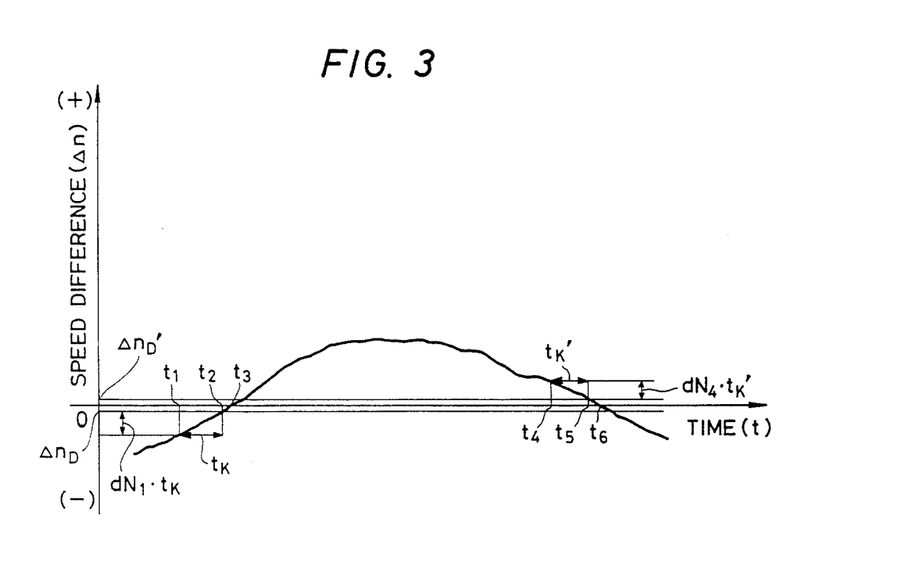
FIG. 3 is a graph illustrating variations in the speed difference between input speed and output speed of a fluid torque transmitting device employed in the embodiment shown in FIG. 2.

Hereupon, assuming that speed difference $\Delta n$ obtained by subtracting the output speed from the input speed of the viscous fluid clutch 20 varies in such a manner as shown in FIG. 3 where the axis of ordinates represents the speed difference $\Delta n$ and the axis of abscissas represents time (t), a target time point for switching the electromagnetic clutch 22 being in disengagement to be in engagement should be an instant $t_2$ at which the speed difference $\Delta n$ increasing in the range of negative value attains to a small negative value $\Delta n_D$ and another target time point for switching the electromagnetic clutch 22 being in engagement to be in disengagement should be an instant $t_5$ at which the speed difference $\Delta n$ decreasing in the range of positive value attains to a small positive value $\Delta n_D'$. By setting thus the switchover between engagement and disengagement of the electromagnetic clutch 22 to be carried out at the instants $t_2$ and $t_5$ which are earlier slightly than each of instants $t_3$ and $t_6$ at which the speed difference $\Delta n$ becomes zero, respectively, the electromagnetic clutch 22 is prevented from having frequently the switchover between engagement and disengagement thereof when the speed difference Δn varies in small scale in a range between the positive value $\Delta n_D'$ and the negative value $\Delta n_D$.

For causing the switchover on the electromagnetic clutch 22 from disengagement to engagement thereof at the instant $t_2$, it is necessary to supply the electromagnetic clutch 22 with the clutch control signal Cc having the first level at an instant $t_1$ earlier by a time $t_k$ corresponding to the time required for the operation for changing the disengaged state to the engaged state of the electromagnetic clutch 22 than the instant $t_2$, and for causing the switchover on the electromagnetic clutch 22 from engagement to disengagement thereof, it is necessary to cease supplying the clutch control signal Cc having the first level at an instant $t_4$ earlier by a time $t_k'$ corresponding to the time required for the operation for changing the engaged state to the disengaged state of the electromagnetic clutch 22 than the instant $t_5$. In order to satisfy this requirement, the variation of the speed difference Δn during a period corresponding to the time $t_k'$ is obtained by making a calculation in accordance with the expression:

$$\left(\frac{d}{dt}\Delta n\right) \cdot t_k \text{ or } \left(\frac{d}{dt}\Delta n\right) \cdot t_k',$$

where $$\frac{d}{dt}\Delta n$$

is the differentia of the speed difference Δn (In FIG. 3, $$\frac{d}{dt}\Delta n$$

at the instant $t_1$ is indicated with $dN_1$ and $$\frac{d}{dt}\Delta n$$

at the instant $t_4$ is indicated with $dN_4$). Next, the value of the speed difference Δn at an instant coming after the period corresponding to the time $t_k$ or $t_k'$ is estimated by adding the obtained variation of the speed difference Δn to the speed difference Δn at that time. That is, $$\Delta n + \frac{d}{dt}\Delta n \cdot t_k \text{ or } \Delta n + \left(\frac{d}{dt}\Delta n\right) \cdot t_k'$$

is calculated. Then, the clutch control signal Cc having the first level is supplied from the control unit 100 to the electromagnetic clutch 22 when the estimated value of the speed difference Δn is equal to or more than the negative value $\Delta n_D$ $$\left(\Delta n + \left(\frac{d}{dt}\Delta n\right) \cdot t_k \geqq \Delta n_D\right),$$

and the supply of the clutch control signal Cc having the first level to the electromagnetic clutch 22 is ceased when the estimated value of the speed difference Δn is equal to or less than the positive value $$\Delta n_D' \quad \left(\Delta n + \left(\frac{d}{dt}\Delta n\right) \cdot t_k' \leqq \Delta n_D'\right).$$

Figure 4:
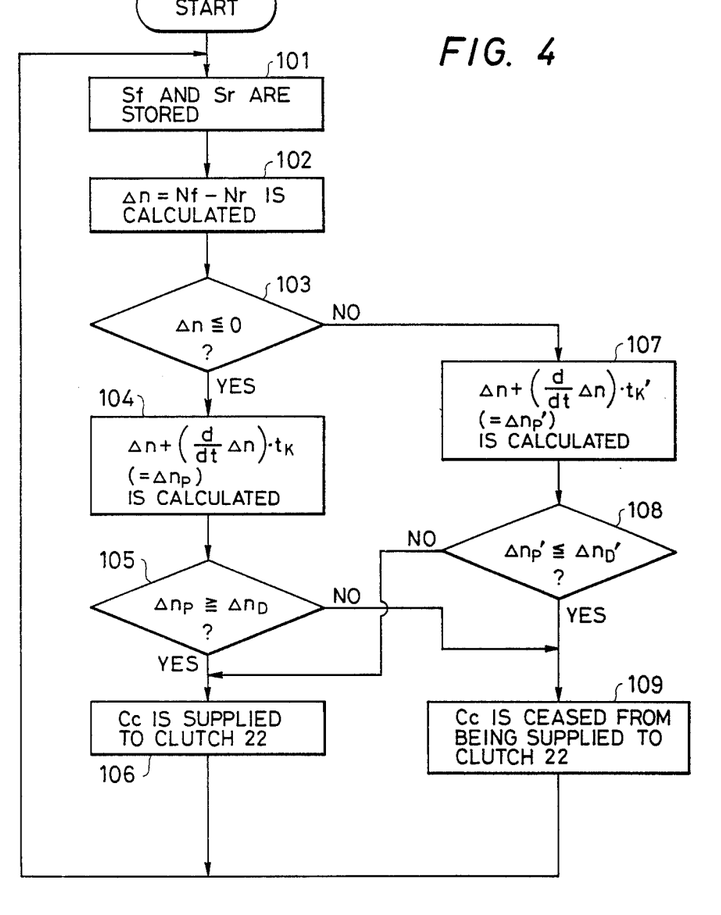
FIG. 4 is a flow chart used for explaining the operation of one example of a control unit employed in the embodiment shown in FIG. 2.

The control unit 100 may be composed of a microcomputer and one example of an operation program of such a microcomputer for performing the above described control is carried out in accordance with a flow chart shown in FIG. 4.

Referring to the flow chart shown in FIG. 4, first, in a process 101, the detection signals Sf and Sr obtained from the front and rear speed sensors 40 and 50, respectively, are stored. Next, in a process 102, the speed difference Δn is calculated by subtracting speed Nr of the input shaft 27 obtained on the strength of the detection signal Sr from speed Nf of the input shaft 26 obtained on the strength of the detection signal Sr. Then, in a decision 103, it is checked whether the speed difference Δn calculated in the process 102 is equal to or less than zero or not, that is, whether the speed Nf of the input shaft 26 is equal to or less than the speed Nr of the input shaft 27 or not. If the speed difference Δn is equal to or less than zero, the step is advanced to a process 104, and if the speed difference Δn is larger than zero, the step is advanced to a process 107.

In the process 104, the variation of the speed difference Δn during a period corresponding to the time $t_k$ is obtained by making a calculation in accordance with the expression:

$$\frac{d}{dt}\Delta n \cdot t_k,$$

and value $\Delta n_p$ of the speed difference Δn at an instant coming after the period corresponding to the time $t_k$ is estimated by adding the obtained variations of the speed difference Δn to the speed difference Δn at that time. Then, in a decision 105, it is checked whether the value $\Delta n_p$ is equal to or more than the negative value $\Delta n_D$ or not. If it is clarified that the value $\Delta n_p$ is equal to or more than the negative value $\Delta n_D$, the clutch control signal Cc having the first level is supplied to the electromagnetic clutch 22 so as to cause the switchover on the electromagnetic clutch 22 from disengagement to engagement in a process 106, and then the step returns to the process 101. To the contrary, if it is clarified that the value $\Delta n_p$ is less than the negative value $\Delta n_D$ in the decision 105, the step is advanced to a process 109 to maintain the condition wherein the clutch control signal Cc having the first level is not supplied to the electromagnetic clutch 22 so that the electromagnetic clutch 22 is kept in disengagement, and than returns to the process 101.

On the other hand, in the process 107, the variation of the speed difference Δn during a period corresponding to the time $t_k'$ is obtained by making a calculation in accordance with the expression:

$$\frac{d}{dt}\Delta n \cdot t_k',$$

and value $\Delta n_p'$ of the speed difference Δn at an instant coming after the period corresponding to the time $t_k'$ is estimated by adding the obtained variation of the speed difference Δn to the speed difference Δn at that time. Then, in a decision 108, it is checked whether the value $\Delta n_p'$ is equal to or less than the positive value $\Delta n_D'$ or not. If it is clarified that the value $\Delta n_p'$ is equal to or less than the positive value $\Delta n_D'$, the clutch control signal Cc having the first level is ceased from being supplied to the electromagnetic clutch 22 so as to cause the switchover on the electromagnetic clutch 22 from engagement to disengagement in the process 109, and then the step returns to the process 101. To the contrary, if it is clarified that the value $\Delta n_p'$ is more than the positive value $\Delta n_D'$ in the decision 108, the clutch control signal Cc having the first level is supplied in succession to the electromagnetic clutch 22 in the process 106 so that the electromagnetic clutch 22 is kept in engagement, and than the step returns to the process 101.

Figure 5:
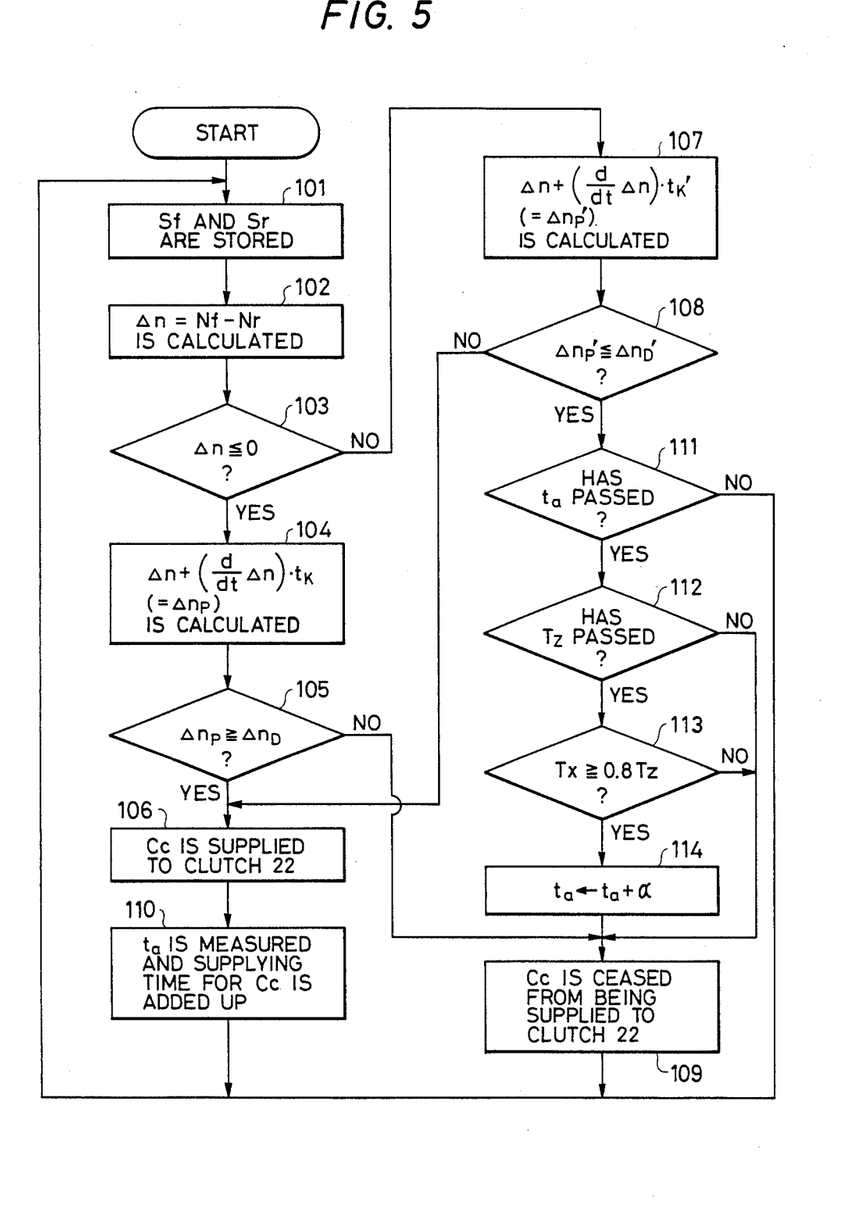
FIG. 5 is a flow chart used for explaining the operation of another example of the control unit employed in the embodiment shown in FIG. 2.

FIG. 5 shows another example of an operation program of the microcomputer constituting the control unit 100 used for controlling the electromagnetic clutch 22, in the form of a flow chart. In the flow chart of FIG. 5, processes and decisions corresponding to those shown in the flow chart of FIG. 4 are marked with the same references and descriptions of steps advanced in the same manner as those in the flow chart of FIG. 4 will be omitted.

Figure 6:
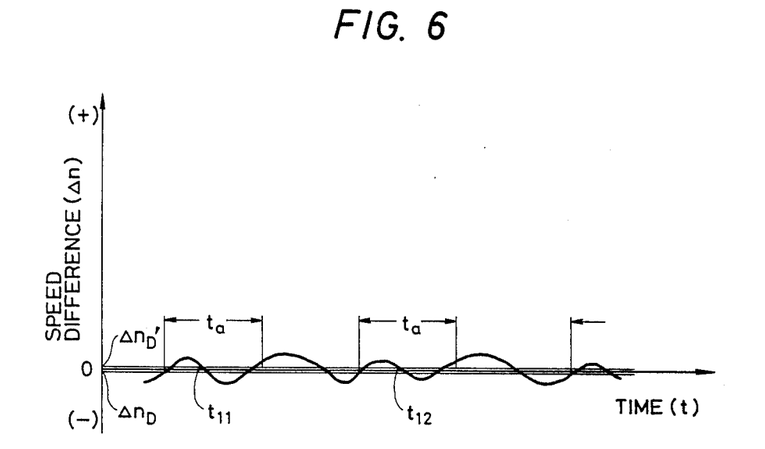
FIGS. 6 and 7 are illustrations used for explaining the operation of the example of the control unit working in accordance with the flow chart shown in FIG. 5.
Figure 7:
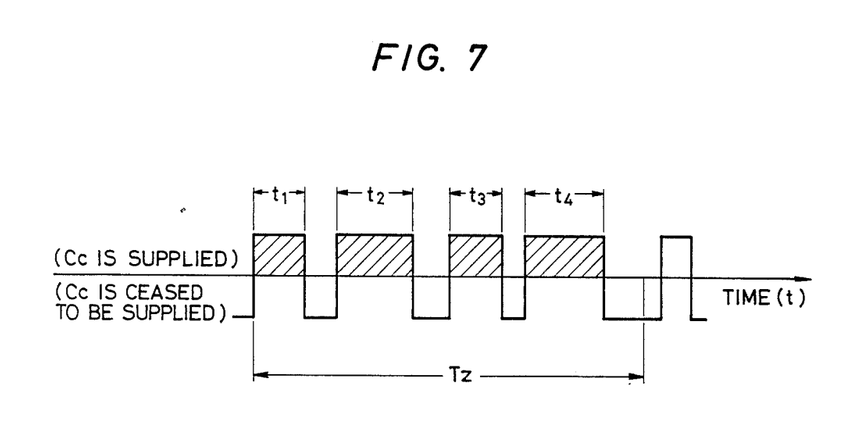

In this example, the steps from a process 101 to a process 106 are carried out in the same manner as those from the process 101 to the process 106 in the flow chart of FIG. 4. Then, after the clutch control signal Cc having the first level is supplied to the electromagnetic clutch 22 in the process 106, the step is advanced to a process 110. In the process 110, a timer contained in the control unit 100 is put in operation for measuring a period $t_a$ as shown in FIG. 6 and explained later, and supplying times $t_1$, $t_2$, $t_3$ and $t_4$ for the clutch control signal Cc in a predetermined period Tz, which are indicated with hatched areas in FIG. 7 and in each of which the clutch control signal Cc is supplied to the electromagnetic clutch 22, are added up. After that, the step returns to the process 101.

Further, the steps of a process 107 and a decision 108 are carried out in the same manner as those of the process 107 and the decision 108 in the flow chart of FIG. 4. Then, in the case where it is clarified that the value $\Delta n_p'$ is equal to or less than the positive value $\Delta n_D'$, it is checked whether the period $t_a$ has passed or not in a decision 111.

This check in the decision 111 is conducted for the purpose of preventing the electromagnetic clutch 22 from having frequently the switchover between engagement and disengagement thereof when the speed difference $\Delta n$ varies frequently between the range of positive value and the range of negative value, and thereby avoiding undesirable shocks affecting to the vehicle. As shown in FIG. 6, if the electromagnetic clutch 22 is kept in engagement until the period $t_a$ has passed after the speed difference $\Delta n$ becomes larger than the negative value $\Delta n_D$ and therefore the electromagnetic clutch 22 is turned to be engaged, even though the speed difference $\Delta n$ is reduced to be equal to the positive value $\Delta n_D'$ at instants $t_{11}$ and $t_{12}$, the number of times of the switchover between engagement and disengagement caused on the electromagnetic clutch 22 can be effectively reduced. Accordingly, in the case where it is clarified that the period $t_a$ has not passed yet in the decision 111, the step returns to the process 101, and when it is clarified that the period $t_a$ has passed in the decision 111, the step is advanced to a decision 112.

In the decision 112, it is checked that the predetermined period Tz measured in the process 110 has passed or not. In the case where it is clarified that the predetermined period Tz has not passed yet in the decision 112, the step is advanced to the process 109 in which the clutch control signal Cc having the first level is ceased from being supplied to the electromagnetic clutch 22, and when it is clarified that the predetermined period Tz has passed in the decision 112, the step is advanced to a decision 113.

In the decision 113, it is checked that the predetermined period Tz measured in the process 110 has passed or not. In the case where it is clarified that the predetermined period Tz has not passed yet in the decision 112, the step is advanced to the process 109 in which the clutch control signal Cc having the first level is ceased from being supplied to the electromagnetic clutch 22, and when it is clarified that the predetermined period Tz has passed in the decision 112, the step is advanced to a decision 113.

In the decision 113, further it is checked that added-up time Tx obtained by addition of the supplying times $t_1$ to $t_4$ in the process 110 is equal to or more than eighty percents of the predetermined period Tz or not. As a result of the check in the decision 113, if the added-up time Tx is equal to or more than, for example, eighty percents of the predetermined period Tz, predetermined time is added to the period $t_a$ so that the period $t_a$ is reset to be a new elongated period in a process 114. With the period $t_a$ thus elongated, the duration in which the electromagnetic clutch 22 is kept in disengegement is shortened. This results in that the vehicle is preferably and easily in the state of the all-wheel drive under the condition wherein a roadway is relatively unstable and the electromagnetic clutch 22 is apt to have frequently the switchover from disengagement to engagement thereof.

To the contrary, if the added-up time Tx is less than eighty percents of the predetermined period Tz, the step is advanced to the process 109 without passing through the process 114, so that the clutch control signal Cc having the first level is ceased from being supplied to the electromagnetic clutch 22, and then the step returns to the process 101.

Although the viscous fluid clutch 20 and the electromagnetic clutch 22 are disposed in the rear torque transmitting path R in the above described embodiment, it is to be understood that the invention is not limited thereto, and that it is also possible to have such a modification that the viscous fluid clutch 20 and the electromagnetic clutch 22 are disposed in the front torque transmitting path F.

What is claimed is:
1. A torque control arrangement for a four-wheel-drive vehicle comprising:
   a fluid torque transmitting device disposed in one of front and rear torque transmitting paths through which torque generated by a power plant is transmitted to front wheels and rear wheels, respectively, and operative to vary torque transmitted therethrough in response to a difference between input speed and output speed thereof,
   a clutch device provided in series to said fluid torque transmitting device for making and breaking the front or rear torque transmitting path in which said fluid torque transmitting device is disposed,
   a front speed reduction device for determining a final drive ratio in the front torque transmitting path,
   a rear speed reduction device for determining a final drive ratio in the rear torque transmitting path, first speed sensing means for detecting the input speed of said fluid torque transmitting device, second speed sensing means for detecting the output speed of said fluid torque transmitting device; and control means responsive to the detection outputs of said first and second speed sensing means to disengage said clutch device when a speed difference obtained by subtracting the output speed of said fluid torque transmitting device from the input speed of said fluid torque transmiting device is reduced to a range of positive values, the upper limit of which is not greater than a predetermined small value close to zero.

2. A torque control arrangement according to claim 1, wherein said control means is operative to engage said clutch device when said speed difference increases to a range of negative values, the lower limit of which is a predetermined negative value close to zero and further to disengage said clutch device when said speed difference decreases to a range of positive values, the upper limit of which is a predetermined positive value close to zero.

3. A torque control arrangement according to claim 1, wherein said control means is operative to supply said clutch device with a control signal for switching said clutch device between engagement and disengagement prior to the time when the output speed of said fluid torque transmitting device becomes substantially equal to the input speed of the fluid torque transmitting device by the amount of time required for changing the state of said clutch device.

4. A torque control arrangement according to claim 3, wherein said control means is operative to cause said clutch device being in disengagement to be engaged when the following relation is satisfied:

$$\Delta n + \left(\frac{d}{dt} \Delta n\right) \cdot t_k \geqq \Delta n_D,$$

where $\Delta n$ represents said speed difference, $$\frac{d}{dt} \Delta n$$

represents the differential of said speed difference, $t_k$ represents a time corresponding to the time required for the operation for changing the disengaged state to the engaged state of said clutch device, and $\Delta n_D$ represents a predetermined negative value close to zero, and further to cause said clutch device being in engagement to be disengaged when the following relation is satisfied $$\Delta n + \left(\frac{d}{dt} \Delta n\right) \cdot t_k' \leqq \Delta n_D',$$

where $t_k'$ represents a time corresponding to the time required for the operation for changing the engaged state to the disengaged state of said clutch device and $\Delta n_D'$ represents a predetermined positive value close to zero.

5. A torque control arrangement according to claim 1, wherein said control means is operative to keep said clutch device in engagement during a predetermined period after said clutch device has switchover from disengagement to engagement thereof.

6. A torque control arrangement according to claim 5, wherein said control means is operative to vary the duration of said predetermined period in response to the length of added-up time obtained by adding up times in each of which said clutch device is in engagement in another predetermined period.

7. A torque control arrangement according to claim 1, wherein the final driving ratio determined by said rear speed reduction device is arranged to be larger than the final driving ratio determined by said front speed reduction device.

8. A torque control arrangement according to claim 7, wherein said control means is operative to supply said clutch device with a control signal for causing said clutch device to have switchover between engagement and disengagement thereof at an instant earlier by a time corresponding to the time requied for the operation for changing the state of said clutch device than an instant at which the output speed of said fluid torque transmitting device becomes substantially equal to the input speed of said fluid torque transmitting device.

9. A torque control arrangement according to claim 1, wherein said fluid torque transmitting device is disposed in said rear torque transmitting path.

10. A torque control arrangement according to claim 1, wherein said first and second speed sensing means are provided for detecting speed of an input shaft of said front speed reduction device and speed of an input shaft of said rear speed reduction device, respectively, and said control means is operative to cause said clutch device being in engagement to be disengaged when a difference between the speed of the input shaft of said rear speed reduction device and the speed of the input shaft of said front speed reduction device has reduced in the range of positive value to be not greater than said predetermined small value close to zero.

11. A torque control arrangement according to claim 10, wherein said control means is operative to supply said clutch device with a control signal for causing said clutch device to have switchover between engagement and disengagement thereof at an instant earlier by a time corresponding to the time required for the operation for changing the state of said clutch device than an instnat at which the speed of the input shaft of said rear speed reduction device becomes substantially equal to the speed of the input shaft of said front speed reduction device.

* * * * *